(12) United States Patent
Zanon et al.

(10) Patent No.: US 7,571,673 B2
(45) Date of Patent: Aug. 11, 2009

(54) METHOD FOR TREATING A WINE, MEASURING ITS APTITUDE FOR AGEING AND DEVICE FOR IMPLEMENTING SAID METHOD

(75) Inventors: Lorenzo Zanon, Champignol lez Mondeville (FR); Franck Thomas, Juans les Pins (FR)

(73) Assignee: Microvision Ltd., Hong Kong (HK)

( * ) Notice: Subject to any disclaimer, the term of this patent is extended or adjusted under 35 U.S.C. 154(b) by 499 days.

(21) Appl. No.: 10/819,760

(22) Filed: Apr. 7, 2004

(65) Prior Publication Data

US 2005/0196499 A1    Sep. 8, 2005

(30) Foreign Application Priority Data

Mar. 4, 2004  (FR) .................................. 04/00523

(51) Int. Cl.
*C12H 1/16*  (2006.01)
*C12H 1/00*  (2006.01)

(52) U.S. Cl. ..................................................... 99/277.1

(58) Field of Classification Search ................ 99/277.1, 99/275, 277, 277.2; 426/237, 592, 330.4; 210/222

See application file for complete search history.

(56) References Cited

U.S. PATENT DOCUMENTS

| 7,100,495 B2 * | 9/2006 | Lutzker | 99/277.1 |
| 2003/0019364 A1 * | 1/2003 | Carvin | 99/275 |

FOREIGN PATENT DOCUMENTS

| CH | 100237 A | 7/1923 |
| DE | 893332 C | 10/1953 |
| DE | 197 21920 A1 | 5/1997 |
| GB | 2292749 | 3/1996 |
| JP | 60153789 | * 8/1985 |
| SU | 737447 A | 10/1978 |
| SU | 737447 A | 5/1980 |
| WO | WO02064726 A1 | 8/2002 |

* cited by examiner

*Primary Examiner*—Reginald L Alexander
(74) *Attorney, Agent, or Firm*—Saile Ackerman LLC; Stephen B. Ackerman; Billy Knowles

(57) ABSTRACT

Method and device for accelerating the ageing of a wine contained in an open or closed container comprising the following steps:
putting a wine to be processed in contact with a silver, gold, and copper alloy element having a surface and a composition defined in order to carry out accelerated and gauged oxidation-reduction of the wine. Thus, a standard for measuring the ageing aptitude of a wine, and for ensuring a wine is tasted under the best conditions, can be realized.

15 Claims, 1 Drawing Sheet

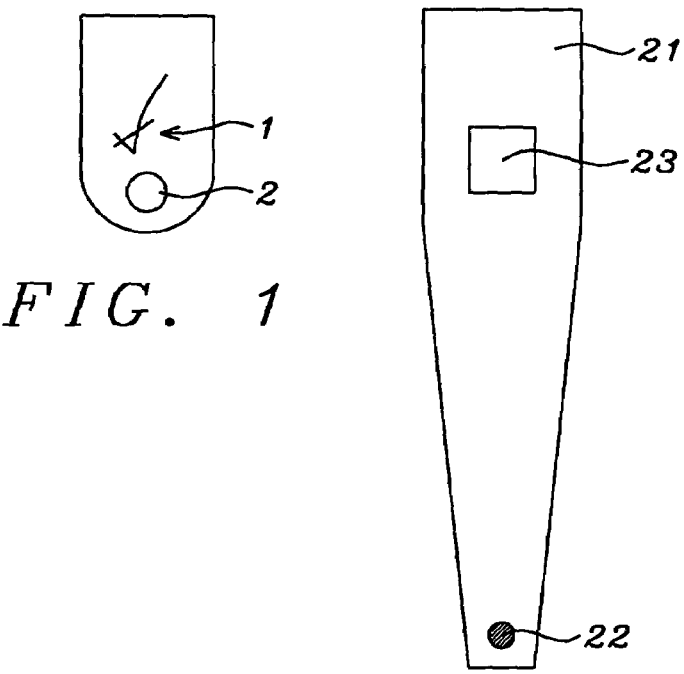
FIG. 1
FIG. 2
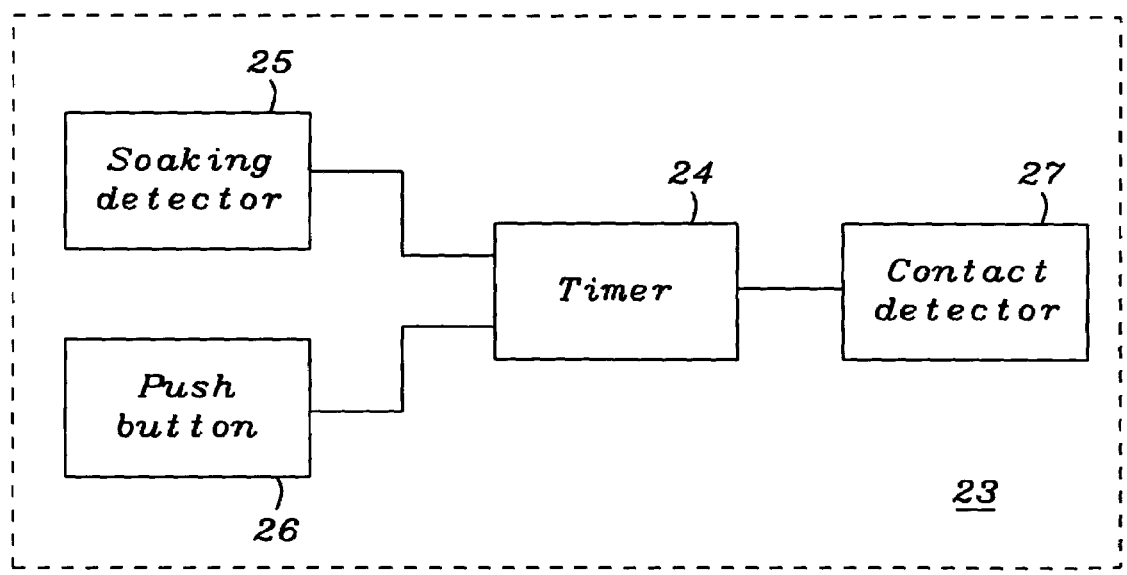
FIG. 3

METHOD FOR TREATING A WINE, MEASURING ITS APTITUDE FOR AGEING AND DEVICE FOR IMPLEMENTING SAID METHOD

TECHNICAL FIELD OF THE INVENTION

The present invention relates to the field of oenology and in particular to a method for accelerating the ageing of a given wine and to a device for implementing said method.

BACKGROUND ART

The aptitude of wines for ageing is traditionally assumed according to vintages, colors, the grape varieties used and wine production methods. Some wines are tasted too early or too late and, very often, the user does not consume them when at their best.

Generally, the ageing of a wine follows its fermentation, which is mainly a process of reduction of the wine. Then, the wine is stored in an antioxidant packing or atmosphere in order to avoid too brutal an oxidation—which is the worst thing for any professional wine producer—and to provide the condition for slow oxidation that will allow the wine to reach its apogee. The main antioxidant elements used are based on sulfur, as sulfites or sulfides, allowing the wine to benefit from the effects of a slow oxidation, ageing in a cellar at constant temperature.

In general, wine is made to age in a cellar for many years in order to ensure slow oxidation-reduction thereof and to allow the emission of aromas and finally ensuring the wine is tasted at its apogee.

This long and necessary ageing period constitutes a drawback for both professionals and consumers. All of them will have to wait many years before making sure that the wine can be tasted under the best conditions.

Moreover, this long period of ageing is an additional obstacle hampering the diffusion of oenological knowledge which, as should be noted, is a science reserved to a few initiates and is not very accessible to the average consumer who can only rely on general indications given in specialist guides or magazines.

Generally, it would be desirable—for professionals as well as for consumers—not to have to wait many years before being able to taste one's wine or realizing that a wine was unsuitable for ageing into a cellar.

It would also be desirable to have a tool that is specific to the science of oenology, making it possible to constitute a standard for wine assessment and aptitude for ageing.

With the present invention, we intend to largely democratize access to the world of oenology and, more generally, to offer everyone—both wine professionals and the general public—a particularly effective tool for judging the quality of this age-old beverage.

SUMMARY OF THE INVENTION

The object of the present invention is to provide a method for creating a perfectly controlled accelerated oxidation-reduction of wine in order to ensure predetermined organoleptic ageing thereof.

Another object of this invention is to realize a simple and effective device making it possible to process wine by means of a perfectly controlled oxidation-reduction and, consequently, to obtain predetermined ageing of the wine.

A third object of this invention consists in realizing a standard for measuring the aptitude for ageing of a wine.

The invention achieves these objects by means of a method of accelerated ageing of a wine contained in an open or closed container, the method comprising the step of:

putting a wine to be processed in contact with a silver/gold/copper alloy element having a surface and a composition defined in order to carry out accelerated and gauged oxidation-reduction of the wine.

Thus, a perfectly controlled gauged oxidation-reduction operation is carried out, ensuring an adapted organoleptic processing, very similar to ageing in a cellar. This operation may have many applications, among which being able to determine the aptitude for ageing of a predetermined wine or, quite simply, tasting a wine having a strong potential under the best conditions.

In a particular embodiment, the alloy element is composed of 60 to 99.9 percent copper, 0.05 to 20 percent silver and 0.05 to 20 percent gold. Preferably, the alloy is composed of 95 percent copper, of 3 percent gold and 2 percent silver.

In a particular embodiment, copper is beaten thus ensuring controlled ageing under the best conditions.

The invention also realizes an oenological device carrying out accelerated yet nevertheless perfectly controlled ageing of a given wine. The device comprises a supporting element that is neutral regarding oxidation and an element having a predetermined contact surface and a predetermined oxidation-reduction capacity.

In a particular embodiment, the alloy element is a circular drop having a composition of 60 to 99.9 percent copper, 0.05 to 20 percent silver and 0.05 to 20 percent of gold.

Preferably, copper is beaten and the composition of the alloy is preferably 95% copper, 3% silver and 2% gold.

Thus, the invention realizes a measuring element or a standard used to measure the aptitude of a given wine for ageing.

In a specific embodiment, the device comprises an electronic circuit for measuring the soaking time combined with a warning circuit in order to increase the accuracy of the ageing aptitude measurement.

BRIEF DESCRIPTION OF THE DRAWINGS

Other features, objects and advantages of the invention will be made clear when reading the following description and drawings, only given by way of nonrestrictive examples. In the accompanying drawings:

FIG. 1 depicts a preferred embodiment of a device for carrying out controlled accelerated ageing of a wine, which is particularly simple to realize, meant for wine producers or even wine connoisseurs.

FIG. 2 depicts a second embodiment of the invention comprising an electronic circuit for measuring the soaking time.

FIG. 3 is a synoptic diagram of the electronic circuit for time measurement.

DESCRIPTION OF PREFERRED EMBODIMENTS

To understand the operation of the method and device according to the invention, it must be pointed out that wine is generally composed of three elements, namely a structure, aromas and grease.

During the development of this product, the wine manufacturer tries to develop a maximum of pleasant aromas on a structure. These aromas will be held by what is usually called "grease", such as aliphatic chains allowing preservation of aromas.

Such fixing—or imprisonment—of aromas follows the reduction operation which results from fermentation. After completion of said reduction operation, the aromas that give a wine its quality (aromas of flowers . . . ) will be with sheltered from the effects of time until the wine is consumed.

This is why most wines—even the noblest ones—should not be consumed before a certain amount of time which corresponds to the oxidation of the elements protecting the aromas—primarily compounds derived from sulfur, and in particular $H_2S$, that are naturally present in wine—ensuring a progressive release of the aromas retained on the structure of the wine.

During wine elaboration, the oxidation-reduction operation is already partially carried out by means of ageing in a cask which allows slow oxygenation via the natural porosity of wood fibers, sometimes combined with a micro-bubbling or micro-oxygenation operation that is sometimes used by professionals.

Once initiated by the wine maker, the oxidation-reduction of the wine continues by means of ageing which is generally carried out in a suitable cellar with given hygrometry and temperature characteristics.

As long as the adequate ageing process has not completed, the wine is in a reduced state and the aromas which which are still protected inside the structure are not accessible to the consumer's palate, thus preventing a satisfactorily appreciation of the inherent quality of the wine. Still in a reduced state, the wine has not reached its apogee and requires a more advanced oxidation so as to release its constitutive aromas. It should be noticed, however, that a too advanced oxidation—what generally occurs for poor or very commonplace wines—will not permit the adequate release of the aromas retained on the structure of the wine.

Even if it had an unquestionable potential, the wine would then bring an impression of dissatisfaction for its aromas could not be released. It is sometimes difficult—even for the most experienced consumer—not to confuse a wine that is too reduced with a wine that is too oxidized.

As it will be seen, the invention makes it possible to avoid such confusion and to readily reveal wines having a strong potential.

In accordance with the invention, by putting the wine in contact with an alloy having a defined oxidation-reduction capacity and a predetermined contact surface, it can be obtained a fully controlled oxidation-reduction operation and an accelerated ageing effect of the same nature than the natural ageing process in a cellar.

Therefore, one can easily distinguish the wines having a strong potential from the wines having a weak potential.

By judiciously choosing the contact surface of the alloy element, together with the composition of said alloy, through test and try operations, one can then realize a standard for measuring wine's aptitude for ageing.

According to the preferred embodiment, the oxidying alloy element comprises three components, namely copper, silver and gold. As it is known, these three components belong to the same classification according to Mendeleev's table and have their own self-oxidizing capacity that combines with that of others.

The contact of these three components, in particular in a specific combination, induces an effect on wine composition and aslo a perfectly controlled ageing of the wine.

More specifically, the silver, gold and copper elements will transform the sulfur element, as a sulfide or sulfite present in the wine, by breaking some liaisons within that element. Consequently, this allows oxidation of the sulfur element, thus causing the release of aromas retained by said element when in a reduced state. The three alloy elements act together, and their effects are mutually strengthened, causing the aromas to be released in the same way they would be in a cellar.

Thus, it is very easy to realize objects that are useful to the oenological art—or simply to consumers and connoisseurs—allowing carrying out a controlled oxidation-reduction operation that will reveal the qualities and potential of any wine.

It is then simple to show that a wine—which is a priori not very satisfactory because it is still too reduced—has indeed a strong potential, by successively soaking the alloy into the wine and later, to distinguish it from very oxidized wines or from wines with low potentials.

Two specific embodiments of the method according to the invention will now be described that allow production of perfectly effective tools that are found to be very useful for professional wine makers and oenologists as well as for consumers.

FIG. 1 illustrates a first embodiment of the invention that is particularly simple and cheap to manufacture, in the form of a tool allowing accelerated—though perfectly controlled—ageing of the wine it is in contact with.

This tool is in the shape of a strip 1 inside which is installed an alloy element 2 having a given surface and being composed of three metals such as copper, gold and silver.

Preferably, element 2 is a circular drop comprising between 60 and 99.9% copper, between 0.05% and 20% silver and between 0.05% and 20% gold. The drop has a diameter ranging from 3 millimeters to 50 millimeters.

The specific composition of the drop determines precisely its oxidizing capacity and the accelerated rate of ageing of the wine it is in contact with. By precisely choosing the contact surface of element 2, it is thus possible to realize an ageing standard, for example one year of ageing per one-second contact with the drop.

Preferably, the following precise composition is adopted for the drop: 95% copper, 3% silver and 2% gold. The drop will have a diameter of about 6 millimeters.

Preferably, the shape of the tool will be sufficiently elongated and narrow to allow direct contact with the wine contained in a bottle.

It should be noted that the tool of FIG. 1 could be manufactured in any shape, giving it an aesthetic quality that is perfectly independent from its function (not shown in FIG. 1 for clarity's sake). In the same way, the drop could readily be given any particular shape, perfectly dissociable from its functional part that consists of an oxidizing alloy contact surface with a wine to process.

As can be seen, the tool of FIG. 1 makes it possible to carry out a perfectly controlled oxidation-reduction operation that allows three applications that could not be made without the invention:

1) deciding, for the producer, whether to rack the wine in the event of a massive reduction or not;

2) improving wine tasting and service conditions for wines with strong potentials;

3) specifying a wine's capacity to be stored. By judiciously choosing the contact surface of the drop, it will be possible to adopt the following measuring unit: in a quantity of 10 cl of wine, one second of contact is equivalent to one year of ageing potential.

In this third application it can be noted that the device according to the invention truly provides a measuring instrument, a wine's ageing aptitude standard.

With this first preferred embodiment—which is particularly simple and cheap to manufacture—consumers will be able to taste their wine at a defined stage of ageing or judge the aptitude of said wine for ageing in a cellar.

The method according to the invention will be advantageously combined with an electronic timer. Indeed, given the alloy composition, the oxidation-reduction effect caused on wine is function of the time the tool is left soaking in a glass—or in any wine container—and such time can opportunely be measured by an electronic system associated with the tool.

FIG. 2 illustrates such an embodiment in the form of a new tool—looking like a thermometer, and that a professional wine maker or consumer will be able to soak in a wine glass or bottle to cause a perfectly controlled oxidation-reduction to happen. In a specific embodiment, the tool takes the form of a support element 21, comprising a gauged alloy drop 22 and an electronic circuit 23 whose synoptic diagram is given in FIG. 3. The electronic circuit 23 comprises a timer element 24—judiciously adapted according to the surface of the drop—and a detecting element 25 for detecting that the tool is soaking in wine. Circuit 23 further comprises a user input element, such as for example a pushbutton 26, on the tool, which makes it possible to generate pulses corresponding to a desired number of years of ageing and an alarm element 27, giving either audio or visual indication. The timer element could be replaced, if necessary, by a microprocessor in the form of an integrated circuit such as a VLSI circuit (Very Large Scale Integrated) associated with memory elements for implementing complementary functions that do not form part of the object of this invention and will therefore not be further developed herein.

When the user—whether a professional wine producer or a consumer—soaks the tool into wine, the timer element starts counting time and as soon as the appropriate time corresponding to the number of pulses generated by the user has elapsed, the alarm element informs the user that he/she can extract the tool from the wine container.

Thus, a particularly effective tool for obtaining a perfectly controlled ageing effect of the wine is realized. The association of electronics with the drop according to the invention makes it possible to reach particularly remarkable precision.

The applications of the invention, under its various embodiments, are numerous and directed to both wine professionals and consumers. Wine professionals will be able to test the quality of their wines and their aptitude for ageing. Consumers will be able to taste their wines at their apogee sooner and thus avoid storing their wine in cellars for many years.

When used according to a rigorous protocol, the method also makes it possible to improve the conditions of production, to avoid or to remove some mercaptans (or thio-alcohols) in the wine. It is also a means to help oenologists and wine makers make decisions from vinification to bottling.

The invention claimed is:

1. A device for oenological use allowing to carry out accelerated ageing of a wine comprising a support element that is neutral regarding oxidation, and an oxidizing element in contact with the wine with a predetermined contact surface and a predetermined oxidation-reduction capacity, in order to realize a controlled accelerated ageing operation, in that the oxidizing element is comprised of an alloy made up of 60 to 99.9% copper, 0.05 to 20% silver and 0.05 to 20% gold.

2. A device according to claim 1 characterized in that the oxidizing element is composed of 95% copper, 3% gold and 2% silver.

3. A device according to claim 2 characterized in that copper is beaten.

4. A device according to claim 1 characterized in that the device comprises an electronic circuit for measuring a predetermined soaking time in order to realize a precise and gauged ageing operation.

5. A device according to claim 1 characterized in that the device has a shape adapted to the neck of a wine bottle or to the aperture in a cask.

6. A device according to claim 1 characterized in that the device comprises an electronic circuit connected to the a oxidizing element for measuring a predetermined soaking time in order to realize a precise and gauged ageing operation.

7. A device according to claim 2 characterized in that the device has a shape adapted to the neck of a wine bottle or to the aperture in a cask.

8. A device according to claim 2 characterized in that the device comprises an electronic circuit connected to the a oxidizing element for measuring a predetermined soaking time in order to realize a precise and gauged ageing operation.

9. A device according to claim 3 characterized in that the device has a shape adapted to the neck of a wine bottle or to the aperture in a cask.

10. A device according to claim 3 characterized in that the device comprises an electronic circuit connected to the a oxidizing element for measuring a predetermined soaking time in order to realize a precise and gauged ageing operation.

11. An instrument for measuring of the aptitude for ageing of a wine, comprising a first support element, neutral regarding oxidation, and an oxidizing element in contact with the wine with a predetermined contact surface and a predetermined oxidation-reduction capacity, in order to realize a controlled accelerated ageing operation, in that the oxidizing element is comprised of an alloy made up of 60 to 99.9% copper, 0.05 to 20% silver and 0.05 to 20% gold.

12. A measuring instrument according to claim 11 characterized in that the oxidizing element is composed of 95% copper, 3% gold and 2% silver.

13. A device for oenological use allowing to give indications on the quality of wines and their aptitude for ageing, characterized in that it is composed of a neutral support and a circular alloy drop placed on the neutral support and in contact with the wine which makes it possible to modify the oxidation-reduction equilibrium of wine, in that the alloy drop has a composition comprising between 60% and 99.9% beaten copper, between 0.05% and 20% silver, and between 0.05% and 20% gold.

14. A device according to claim 13, characterized in that the circular alloy drop has a diameter that is between approximately 3 millimeters and approximately 50 millimeters.

15. A device according to claim 13 characterized by the alloy drop having a composition comprised of 95% copper, 3% gold and 2% silver.

* * * * *